US011441665B2

(12) United States Patent
Kawamura et al.

(10) Patent No.: US 11,441,665 B2
(45) Date of Patent: Sep. 13, 2022

(54) WORM REDUCER AND METHOD FOR MANUFACTURING WORM REDUCER

(71) Applicant: JTEKT CORPORATION, Osaka (JP)

(72) Inventors: Naofumi Kawamura, Kishiwada (JP); Hirofumi Ueda, Shiki-gun (JP)

(73) Assignee: JTEKT CORPORATION, Kariya (JP)

( * ) Notice: Subject to any disclaimer, the term of this patent is extended or adjusted under 35 U.S.C. 154(b) by 2 days.

(21) Appl. No.: 17/081,367

(22) Filed: Oct. 27, 2020

(65) Prior Publication Data

US 2021/0131549 A1  May 6, 2021

(30) Foreign Application Priority Data

Nov. 1, 2019 (JP) .............................. JP2019-199712

(51) Int. Cl.
| | | |
|---|---|---|
| *F16H 55/24* | (2006.01) | |
| *B62D 5/04* | (2006.01) | |
| *F16H 57/022* | (2012.01) | |
| *F16H 57/023* | (2012.01) | |
| *F16H 57/12* | (2006.01) | |
| *F16H 57/021* | (2012.01) | |

(52) U.S. Cl.
CPC ........... *F16H 55/24* (2013.01); *B62D 5/0409* (2013.01); *F16H 57/022* (2013.01); *F16H 57/023* (2013.01); *F16H 57/12* (2013.01); *F16H 2057/0213* (2013.01); *F16H 2057/0222* (2013.01); *F16H 2057/127* (2013.01)

(58) Field of Classification Search
CPC ...... F16H 55/24; F16H 57/022; F16H 57/023; F16H 57/12; F16H 2057/0213; F16H 2057/0222; F16H 2057/127
See application file for complete search history.

(56) References Cited

U.S. PATENT DOCUMENTS

| | | | |
|---|---|---|---|
| 9,452,773 B2* | 9/2016 | Sato | B62D 5/0421 |
| 2012/0153580 A1* | 6/2012 | Soma | B23B 31/1173 |
| | | | 279/50 |
| 2015/0075899 A1* | 3/2015 | Kikuchi | F16H 57/12 |
| | | | 180/444 |
| 2016/0318545 A1 | 11/2016 | Uchihara et al. | |

FOREIGN PATENT DOCUMENTS

| | | | | |
|---|---|---|---|---|
| JP | 2015-123769 A | | 7/2015 | |
| KR | 20110052143 A | * | 5/2011 | ............... B62D 3/04 |

OTHER PUBLICATIONS

Feb. 12, 2021 Search Report issued in European Patent Application No. 20204842.7.

* cited by examiner

*Primary Examiner* — Thomas C Diaz
(74) *Attorney, Agent, or Firm* — Oliff PLC

(57) ABSTRACT

A worm reducer includes a worm shaft; a worm wheel; a housing that houses the worm shaft and the worm wheel; a bearing that holds the worm shaft inside the housing; a coil spring that contacts an outer peripheral surface of the bearing and applies an urging force toward the worm wheel; and a preload member that is screwed into and fixed to the housing and pressurizes the coil spring. A winding direction of the coil spring is different from a winding direction of a thread of the preload member, and contact resistance between the coil spring and the preload member is greater than contact resistance between the coil spring and the bearing.

3 Claims, 5 Drawing Sheets

WORM REDUCER AND METHOD FOR MANUFACTURING WORM REDUCER

CROSS-REFERENCE TO RELATED APPLICATION

This application claims priority to Japanese Patent Application No. 2019-199712 filed on Nov. 1, 2019, incorporated herein by reference in its entirety.

BACKGROUND

1. Technical Field

The disclosure relates to a worm reducer in which a worm shaft is urged toward a worm wheel.

2. Description of Related Art

In order to prevent backlash, there has been a worm reducer in which a worm shaft is urged toward a worm wheel by a spring force of a coil spring (e.g., see Japanese Patent Application Publication No. 2015-123769 (JP2015-123769A)). Such a worm reducer can restrain generation of, for example, a collision sound (tapping sound) between a holder that houses a bearing and a gear case.

SUMMARY

However, the inventors of the disclosure have found that some worm reducers including coil springs generate an abnormal sound different from the tapping sound. After conducting further experiments and research, the inventors have found that the abnormal sound is a stick-slip sound between the coil spring and the bearing, have found a positional relationship between the bearing and the coil spring in which the stick-slip sound is hardly generated, and have found a structure and a manufacturing method in which the coil spring can be easily disposed, with a high probability, at a position where the stick-slip sound is hardly generated with respect to the bearing without increasing the number of parts and without requiring a complicated structure.

The disclosure has been made based on the above finding of the inventors and provides a worm reducer capable of restraining generation of a stick-slip sound with a high probability and a method for manufacturing the worm reducer.

A first aspect of the disclosure relates to a worm reducer including a worm shaft; a worm wheel; a housing that houses the worm shaft and the worm wheel; a bearing that holds the worm shaft inside the housing; a coil spring that contacts an outer peripheral surface of the bearing and applies an urging force toward the worm wheel; and a preload member that is screwed into and fixed to the housing and pressurizes the coil spring. A winding direction of the coil spring is different from a winding direction of a thread of the preload member, and contact resistance between the coil spring and the preload member is greater than contact resistance between the coil spring and the bearing.

A second aspect of the disclosure relates to a method for manufacturing a worm reducer including a worm shaft, a worm wheel, a housing that houses the worm shaft and the worm wheel, a bearing that holds the worm shaft inside the housing, a coil spring that contacts an outer peripheral surface of the bearing and applies an urging force toward the worm wheel, and a preload member that is screwed into and fixed to the housing and pressurizes the coil spring. The method includes disposing the coil spring such that one end of the coil spring in a winding axis direction contacts the bearing; and screwing the preload member into the housing. A winding direction of the coil spring is different from a winding direction of a thread of the preload member. In an initial stage in which the preload member is screwed into the housing, the coil spring is rotated together with the preload member. In a final stage in which the preload member is screwed into the housing, a position of a first distal end portion that is a distal end of a wire rod forming the coil spring is fixed within a predetermined range so that the distal end is located on a side of the bearing, and the preload member and the coil spring slide relative to each other, thereby the preload member is attached to the housing.

With the worm reducer and the method for manufacturing the worm reducer according to the above aspects of the disclosure, the distal end of the wire rod of the coil spring can be disposed, with a high probability, at a position within a predetermined range with respect to the bearing, thereby increasing the possibility of restraining the generation of a stick-slip sound between the coil spring and the bearing.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Embodiments of the disclosure will be specifically described below with reference to the drawings. Note that all the embodiments described below show comprehensive or specific examples of the disclosure. Numerical values, shapes, materials, components, arrangement positions and connection forms of the components, steps, sequence of steps, and the like shown in the following embodiments are examples and are not intended to limit the disclosure. Among the components in the following embodiments, components that are not described in the independent claim indicating the uppermost concept will be described as optional components.

The drawings are schematic drawings in which emphasis, omission, and ratio adjustment have been performed as appropriate to show the disclosure and may be different from actual shapes, positional relationships, and ratios.

Figure 1:
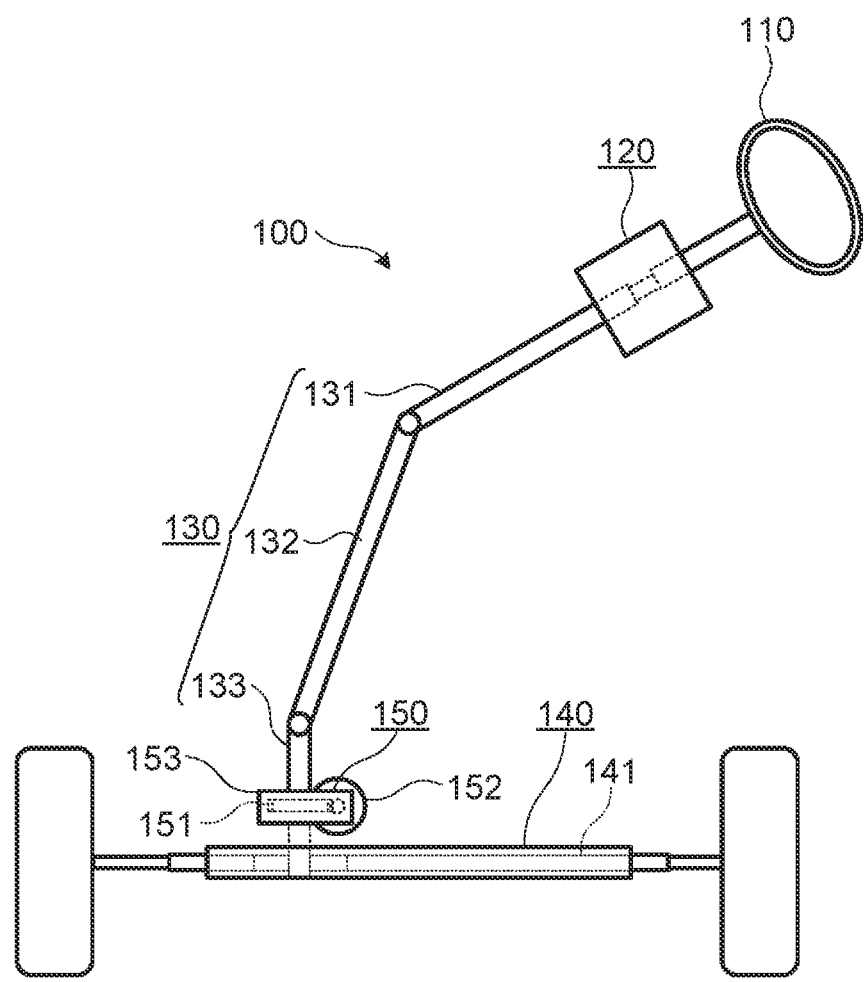
FIG. 1 is a diagram showing an overall configuration of a steering system.

First, an overall configuration of a steering system 100 provided with a worm reducer according to an embodiment of the disclosure will be described. FIG. 1 is a diagram schematically showing an overall configuration of the steering system.

As shown in FIG. 1, a steering system 100 is a power steering system that assists a force of a driver to rotate a steering member 110 for steering, such as a steering wheel. The steering system 100 includes a steering shaft 130 that rotates in accordance with the rotation of the steering member 110; a rack and pinion device 140 that converts the rotation of the steering shaft 130 to reciprocation of a turning shaft 141; a sensor device 120 configured to detect steering torque generated by the steering member 110; and a worm reducer 150 configured to apply a steering assist force to the steering shaft 130 based on a signal from the sensor device 120.

The worm reducer 150 is a device that is connected to the motor 152 and applies an assist force for assisting the steering to the steering shaft 130 by using the motor 152 as a drive source. Note that the motor 152 is controlled by an electronic control unit (ECU) (not shown), and the assist force to be applied to the steering shaft 130 is adjusted appropriately.

The steering shaft 130 includes three shafts, that is, a column shaft 131, an intermediate shaft 132, and a pinion shaft 133 that are arranged in the stated order from the steering member 110-side. In the power steering system, a position at which the worm reducer 150 is attached is not particularly limited, but in the case of the present embodiment, the worm reducer 150 is coupled to the pinion shaft 133.

Figure 2:
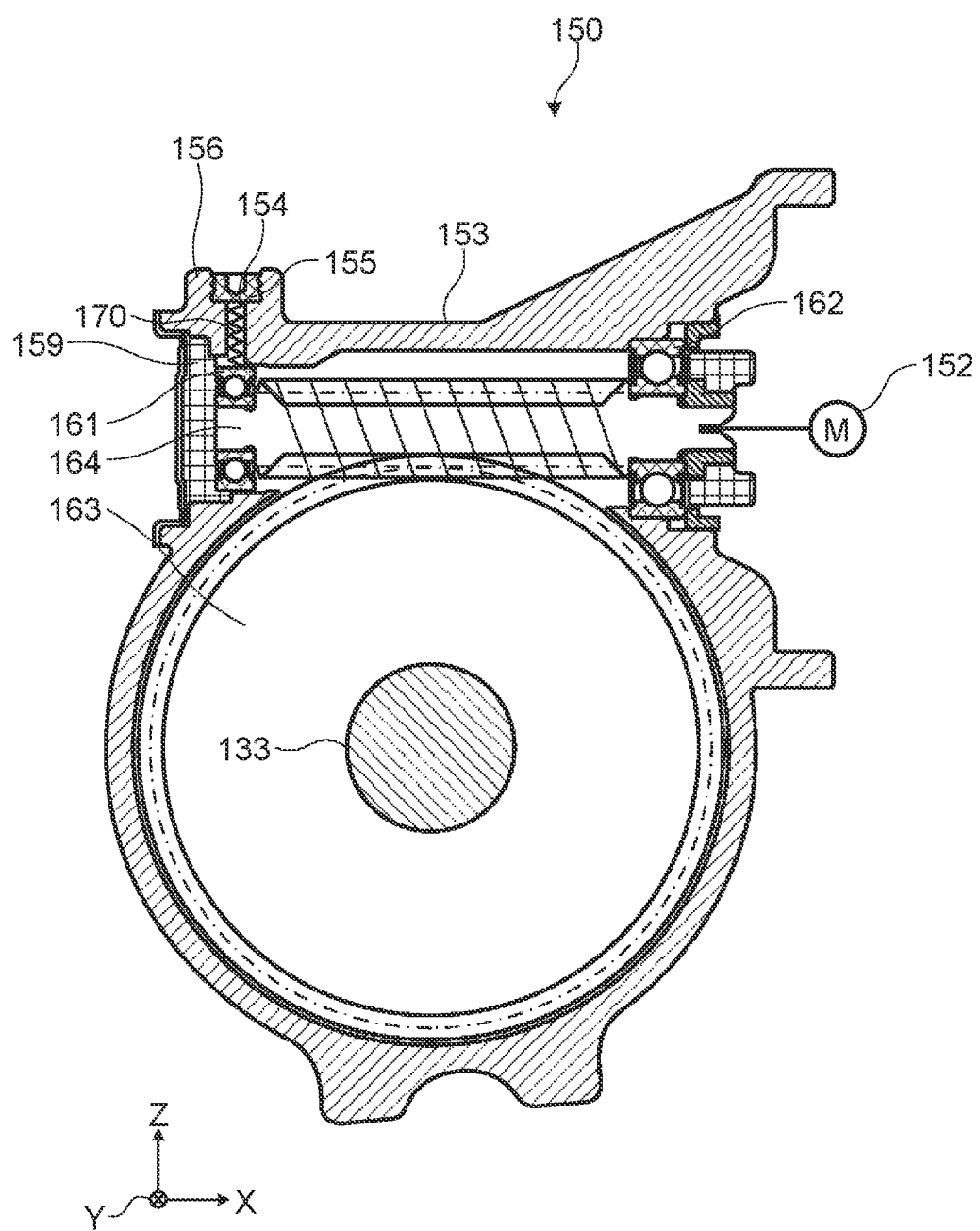
FIG. 2 is a sectional view showing an internal structure of a worm reducer according to a present embodiment.

FIG. 2 is a sectional view showing an internal structure of the worm reducer. As shown in the figure, the worm reducer 150 includes a worm shaft 164, a worm wheel 163, a housing 153, a bearing 161, a coil spring 170, and a preload member 155.

The housing 153 is a box-shaped structural member that houses the worm shaft 164 and the worm wheel 163 and is provided with a hole 154 extending through the housing 153 and an engagement portion 156 disposed outside the hole 154. A coil spring 170 is disposed in the hole 154. The preload member 155 that pressurizes the coil spring 170 is attached to the engagement portion 156.

The hole 154 is a through-hole extending from an outside of the housing 153 to an inside of the housing 153 in a radial direction of the bearing 161. The shape of the hole 154 is not particularly limited, but in the case of the present embodiment, the shape is cylindrical.

The engagement portion 156 is a cylindrical portion provided coaxially with the hole 154 and has a female thread provided on an inner peripheral surface thereof.

The preload member 155 is a member that has, on an outer periphery thereof, a male thread threadedly engaged with the engagement portion 156 of the housing 153. The preload member 155 is fixed by being screwed into the engagement portion 156, and pressurizes the coil spring 170. Although the shape of the preload member 155 is not particularly limited, in the case of the present embodiment, the preload member 155 is a cylindrical member (in other words, a columnar member). The preload member 155 has a surface that contacts the coil spring 170, and the surface is a flat surface perpendicular to a winding axis of the coil spring 170 (Z-axis direction in the figure).

Although the method for manufacturing the preload member 155 is not particularly limited, in the case of the present embodiment, the preload member 155 is a forged product made of an iron material such as SS400 or S15C, and a surface of the preload member 155, which contacts the coil spring 170, is formed by forging and is not subjected to finishing such as cutting.

The worm shaft 164 is rotatably held by a bearing 161 and an other-end bearing 162 in a worm shaft housing portion. The worm shaft 164 is held so as to be tiltable about the other-end bearing 162 and is pressed against the worm wheel 163 by an urging force of the coil spring 170. In the case of the present embodiment, the worm shaft 164 is coupled to the motor 152 and rotates about an axis at high speed.

The worm wheel 163 is rotatably held in the worm wheel housing portion. In the case of the present embodiment, the worm wheel 163 is coupled to the pinion shaft 133, and amplifies torque that has been input to the worm shaft 164 to apply assist torque to the pinion shaft 133.

The bearing 161 holds one end of the worm shaft 164 inside the housing 153. The bearing 161 is held so as to be able to reciprocate with respect to the housing 153 in a direction toward the worm wheel 163 (Z-axis direction in the figure), and the bearing 161 can tilt the worm shaft 164 with respect to the other-end bearing 162 that holds the other end of the worm shaft 164.

A material constituting the bearing 161 is not particularly limited, but in the case of the present embodiment, bearing steel (SUJ2, etc.) is adopted as a material of at least an outer ring of the bearing 161.

Figure 3:
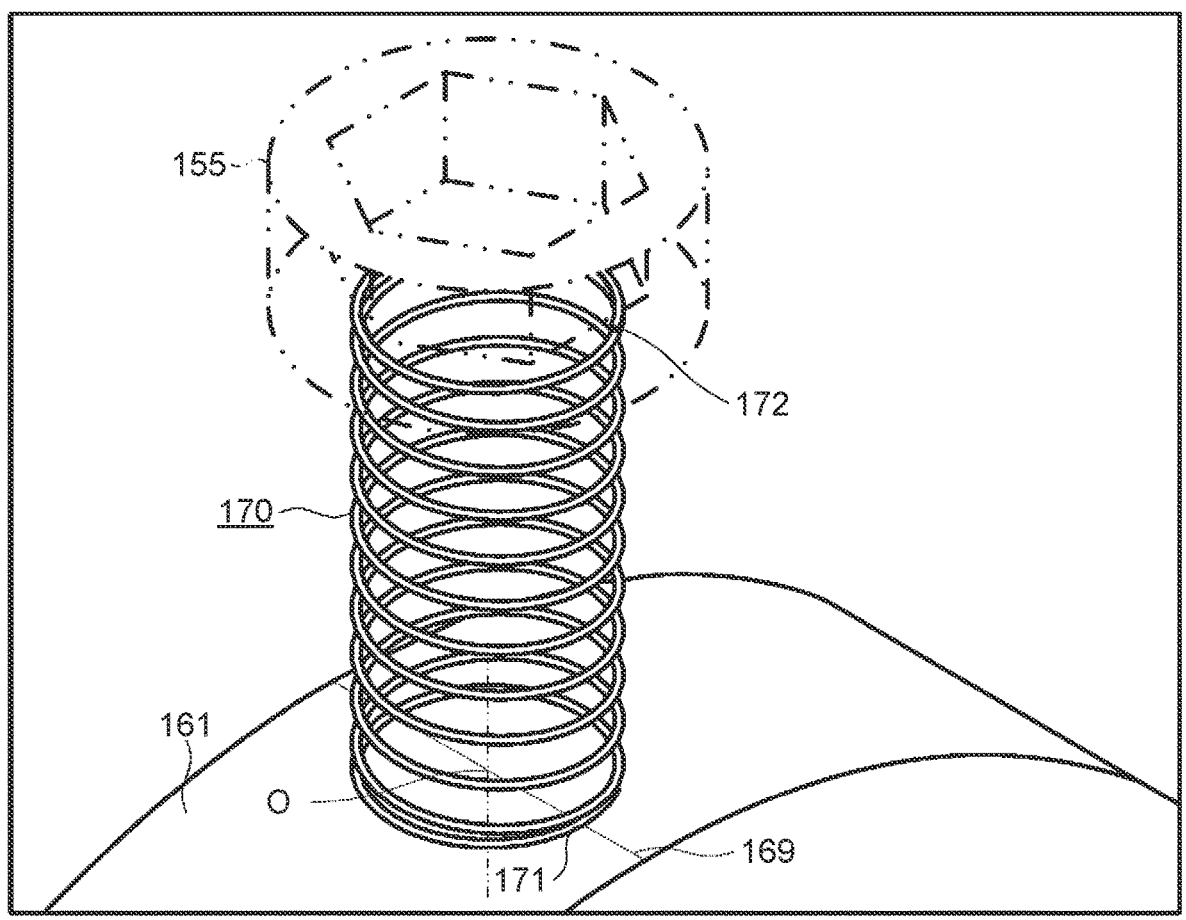
FIG. 3 is a perspective view showing a coil spring according to the present embodiment, a bearing which the coil spring contacts, and the vicinity of the bearing.

FIG. 3 is a perspective view showing a coil spring, the bearing which the coil spring contacts, and the vicinity of the bearing. As shown in the figure, the coil spring 170 is a compression spring that contacts an outer peripheral surface of the bearing 161 and applies an urging force for pressing the worm shaft 164 toward the worm wheel 163 (toward the Z-axis negative side in the figure) with respect to the preload member 155 screwed into and fixed to the housing 153.

The coil spring 170 has one end supported by the preload member 155 screwed into the hole 154 of the housing 153, and the coil spring 170 pressurizes the bearing 161 disposed inside the housing 153 by an urging force. A material of the wire rod constituting the coil spring 170 is not particularly limited, but in the case of the present embodiment, a so-called piano wire (SWP-B wire) is used.

A winding direction of the coil spring 170 is set to a direction opposite to a winding direction of a thread of the preload member 155. In the case of the present embodiment, the preload member 155 has a right-handed thread provided on the outer periphery thereof, and the preload member 155 moves toward the bearing 161 when rotated rightward (i.e., in a clockwise direction) with respect to the housing 153. In contrast, the coil spring 170 is left-handed (i.e., the winding direction is a left-handed direction), and when the wire rod of the coil spring 170 is viewed from the preload member 155 toward the bearing 161, the wire rod is turned leftward, in other words, the wire rod is wound leftward (in a counterclockwise direction).

Contact resistance between the coil spring 170 and the preload member 155 is greater than contact resistance between the coil spring 170 and the outer peripheral surface of the outer ring of the bearing 161. That is, at the time of screwing the preload member 155 into the housing 153, the coil spring 170 rotates together with the preload member 155 and is brought into a sliding state on the bearing 161.

Figure 4:
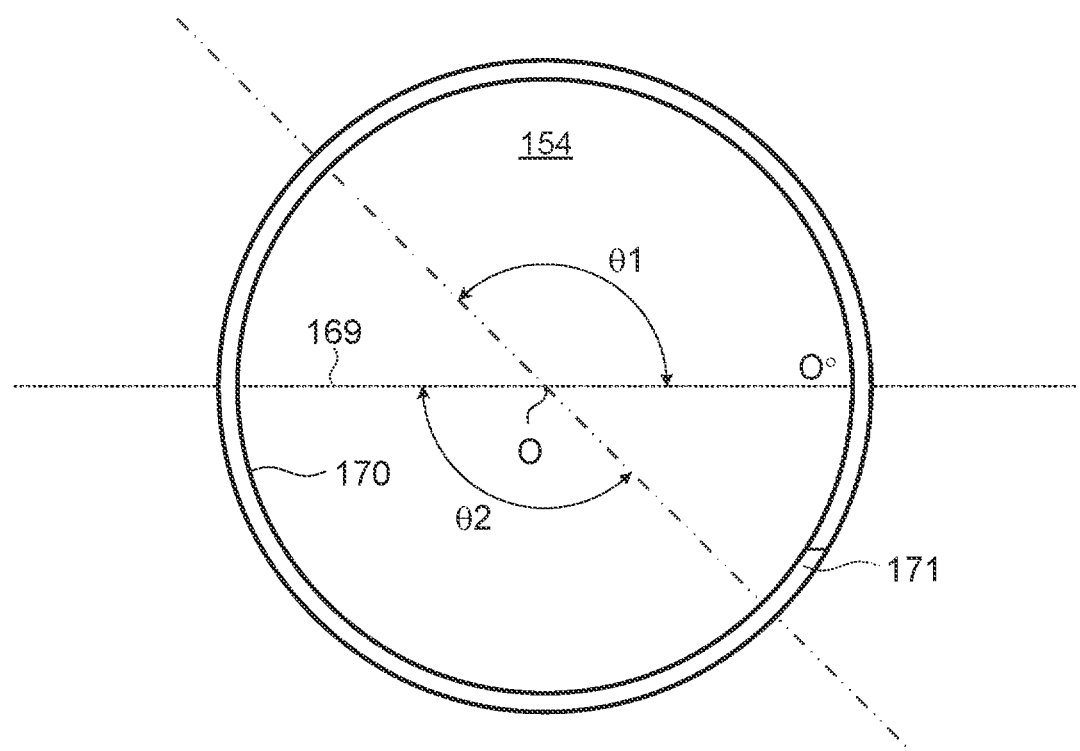
FIG. 4 is a plan view showing a positional relationship of a first distal end portion of the coil spring with respect to the bearing according to the present embodiment.
Figure 4:
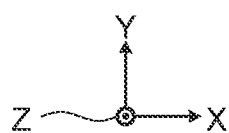

As described above, a positional relationship of a distal end of a first distal end portion 171 of the coil spring 170 with respect to the bearing 161 may fall within a range shown below. As shown in FIG. 4, it is assumed that in the flat surface (XY flat surface in the figure) perpendicular to an urging direction of the coil spring 170 (i.e., a direction in which the coil spring 170 applies an urging force), a point at which the winding axis of the coil spring 170 and the flat surface intersect each other is referred to as an apex O. It is also assumed that one side (right side in the figure) of a ridge 169 on the outer peripheral surface of the bearing 161 with respect to the apex O is defined as 0° while the other side (left side in the figure) of the ridge 169 is defined as 180°, and the angle increases counterclockwise. In this case, when the winding direction of the coil spring 170 is counterclockwise toward the bearing 161, there is a very high probability that an angle range in which the distal end of the first distal end portion 171 is disposed is 0°<θ≤135° (θ1 in the figure) or 180°<θ≤315° (θ2 in the figure).

In a case where the worm reducer 150 having the above configuration is manufactured, the coil spring 170 wound in a direction opposite to the winding direction of the thread provided on the outer periphery of the preload member 155 is inserted into the hole 154, and then the preload member 155 is screwed into the engagement portion 156 of the housing 153, and thus, a position of the first distal end portion 171 with respect to the ridge 169 of the bearing 161 is determined, and the coil spring 170 is brought to a preload state. In a final stage in which the preload member 155 is screwed into the housing 153, the preload member 155 and the coil spring 170 slide relative to each other, thereby the preload member 155 is attached to the housing 153.

Further, the coil spring 170 supported by the preload member 155 urges the worm shaft 164 toward the worm wheel via the bearing 161. The worm shaft 164 tilts with respect to the other-end bearing 162 by the movement of the pressurized bearing 161 and is engaged with the worm wheel 163 in a state where an inter-shaft distance between the worm shaft 164 and the worm wheel 163, which restrains backlash therebetween, is maintained. That is, the so-called anti-backlash system (ABLS) of the present embodiment is provided.

Specifically, the worm shaft 164 and an output shaft of the motor 152 are connected via a rubber spring made of an elastic material, and the worm shaft 164 is allowed to tilt with respect to the output shaft of the motor 152. The other-end bearing 162 that supports the motor 152-side of the worm shaft 164 is a rolling bearing, has an outer ring fixed to the housing 153, and has an inner ring to which the worm shaft 164 is connected. The inner ring is allowed to tilt with respect to the outer ring. On the other hand, the bearing 161 that supports the opposite side of the worm shaft 164 is provided in the housing 153 so as to be movable in a direction in which the bearing 161 contacts and separates from the worm wheel 163 (Z-axis direction in the figure). The outer ring of the bearing 161, which is a rolling bearing, is urged in a direction approaching the worm wheel 163 by an elastic force of the coil spring 170.

With the worm reducer 150 having the above configuration, even in a case where vibration is applied to the coil spring 170 or the coil spring 170 is repeatedly extended, it is possible to maintain the position of the first distal end portion 171 and to continuously restrain a stick-slip sound generated between the coil spring 170 and the bearing 161 only by disposing the coil spring 170 at a predetermined position and screwing the preload member 155 into the housing 153. Further, since the worm shaft 164 tilts about the other-end bearing 162, and the optimal inter-shaft distance between the worm shaft 164 and the worm wheel 163 is maintained, it is possible to restrain a collision sound even in a case where sudden torque is generated in the worm shaft 164.

Note that the disclosure is not limited to the above embodiment. For example, another embodiment, which is realized by arbitrarily combining the components described in the present specification or by excluding some of the components, may be regarded as an embodiment of the disclosure. The disclosure includes modified examples that can be obtained by making various modifications, which are conceived by a person skilled in the art, to the above embodiment without departing from the scope of the disclosure.

For example, in a case where the preload member 155 has a left-handed thread on the outer periphery thereof, and the preload member 155 advances toward the bearing 161 when rotated leftward (in a counterclockwise direction) with respect to the housing 153, the coil spring 170 is right-handed (i.e., the winding direction is a right-handed direction), and when the wire rod of the coil spring 170 is viewed from the preload member 155 toward the bearing 161, the wire rod is turned rightward, that is, the wire rod is wound rightward (in a clockwise direction).

Figure 5:
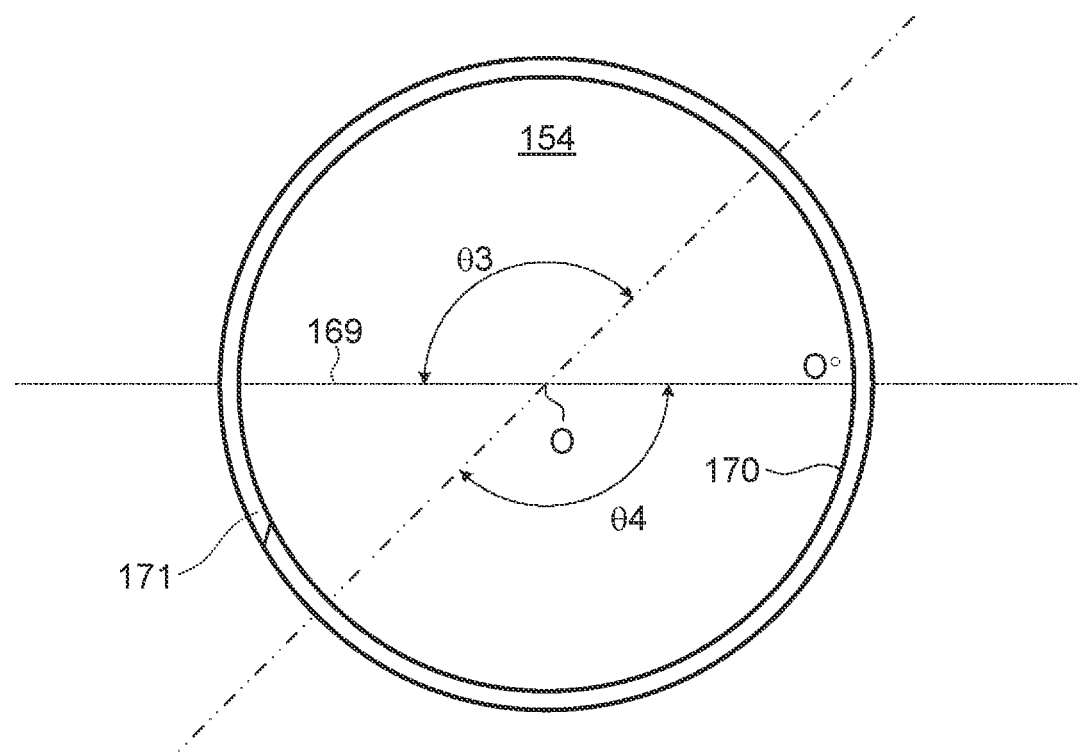
FIG. 5 is a plan view showing a positional relationship of a first distal end portion of a right-handed coil spring with respect to the bearing.
Figure 5:
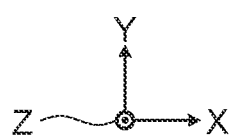

In this case, as shown in FIG. 5, the winding direction of the coil spring 170 is clockwise toward the bearing 161, and thus, there is a high probability that the angle range in which the distal end of the first distal end portion 171 is disposed is 45°≤θ<180° (θ3 in the figure) or 225°≤θ<360° (θ4 in the figure).

The surface of the preload member 155, which contacts the coil spring 170, may be the flat surface, and may also be a surface of revolution with the winding axis of the coil spring 170 serving as an axis of the revolution, such as a surface having a conical shape (i.e., a conical surface) or a surface having a hemispherical shape (i.e., a hemispherical surface).

The disclosure is applicable to a worm reducer including a coil spring as a component of an anti-backlash system.

What is claimed is:

1. A worm reducer comprising:
   a worm shaft;
   a worm wheel;
   a housing that houses the worm shaft and the worm wheel;
   a bearing that holds the worm shaft inside the housing;
   a coil spring that contacts an outer peripheral surface of the bearing and applies an urging force toward the worm wheel; and
   a preload member that is screwed into and fixed to the housing and pressurizes the coil spring,
   wherein a winding direction of the coil spring is different from a winding direction of a thread of the preload member, and contact resistance between the coil spring and the preload member is greater than contact resistance between the coil spring and the bearing, and
   a position of a first distal end portion of a wire rod forming the coil spring is disposed within a predetermined circumferential range around a winding axis of the coil spring, so that the first distal end portion is located on a side of the bearing.

2. The worm reducer according to claim 1, wherein the preload member has a surface that contacts the coil spring, and the surface is a flat surface perpendicular to a winding axis of the coil spring or a surface of revolution with the winding axis serving as an axis of the revolution.

3. A method for manufacturing a worm reducer including a worm shaft, a worm wheel, a housing that houses the worm shaft and the worm wheel, a bearing that holds the worm shaft inside the housing, a coil spring that contacts an outer peripheral surface of the bearing and applies an urging force toward the worm wheel, and a preload member that is screwed into and fixed to the housing and pressurizes the coil spring, the method comprising:

disposing the coil spring such that one end of the coil spring in a winding axis direction contacts the bearing; and screwing the preload member into the housing, wherein a winding direction of the coil spring is different from a winding direction of a thread of the preload member, and contact resistance between the coil spring and the preload member is greater than contact resistance between the coil spring and the bearing, wherein in an initial stage in which the preload member is screwed into the housing, the coil spring is rotated together with the preload member, and wherein in a final stage in which the preload member is screwed into the housing, a position of a first distal end portion of a wire rod forming the coil spring is disposed within a predetermined circumferential range around a winding axis of the coil spring, so that the first distal end portion is located on a side of the bearing, and the preload member and the coil spring slide along with each other towards the bearing, thereby the preload member is attached to the housing.

* * * * *